No. 12,315. REISSUED FEB. 7, 1905.
H. SIEGWART.
CONCRETE BEAM, GIRDER, &c., WITH IRON BARS INLAID, FOR BUILDING PURPOSES.
APPLICATION FILED SEPT. 21, 1904.
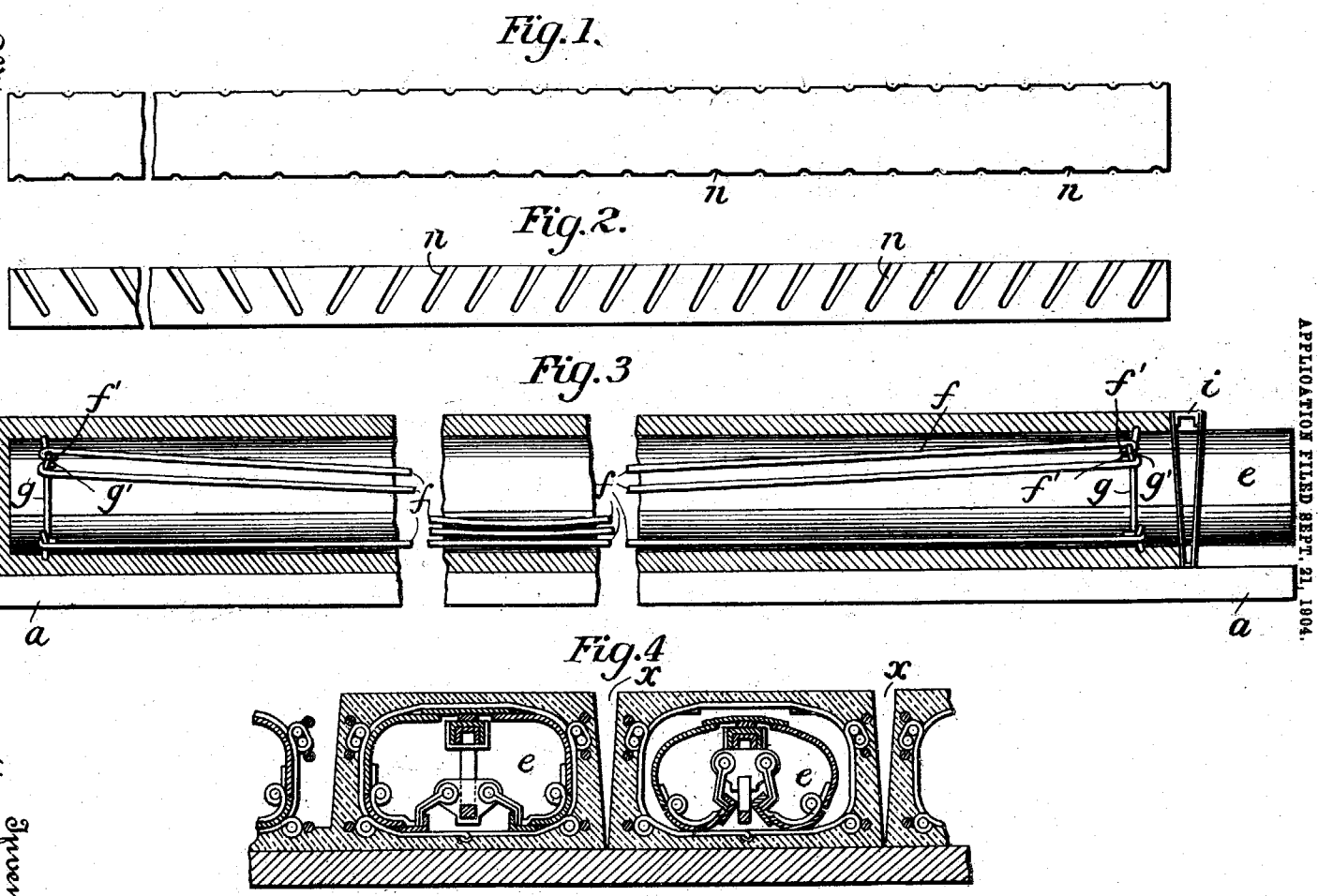
Witnesses
J. G. Hinkel
Arthur L. Bryant
Inventor
Hans Siegwart
by Foster Freeman & Watson
Attorneys No. 12,315. Reissued February 7, 1905.

UNITED STATES PATENT OFFICE.

HANS SIEGWART, OF LUCERNE, SWITZERLAND.

CONCRETE BEAM, GIRDER, &c., WITH IRON BARS INLAID, FOR BUILDING PURPOSES.

SPECIFICATION forming part of Reissued Letters Patent No. 12,315, dated February 7, 1905.

Original No. 720,747, dated February 17, 1903. Application for reissue filed September 21, 1904. Serial No. 225,427.

DIVISION B.

*To all whom it may concern:*

Be it known that I, HANS SIEGWART, architect, a citizen of the Republic of Switzerland, and a resident of Lucerne, Switzerland, have invented certain new and useful Improvements in Concrete Beams, Girders, and the Like with Iron Rods or Bars Inlaid, for Building Purposes; and I do hereby declare the following to be a full, clear, and exact description of the invention, such as will enable others skilled in the art to which it appertains to make and use the same, reference being had to the accompanying drawings, and to the characters of reference marked thereon, which form part of this specification, and in which—

Figure 1 is a plan view of part of one of the improved girders; Fig. 2, a side view; Fig. 3, a side view showing the manner in which iron rods are arranged and supported so as to be embedded in the girder, the latter in section. Fig. 4 is an enlarged cross-section showing the position of a plurality of girders in the process of construction.

In the manufacture of my improved columns, beams, or girders and the like for building purposes I make use of a plastic material or composition, preferably of beton, concrete, or Portland cement, which is placed in a mass of suitable thickness upon a bed *a* and around a series of collapsible cores or formers *e*, so constructed that they may be expanded, as shown at the left in Fig. 4, while the mass of material is being deposited round the same and after the material is hardened can be contracted, as shown at the right in said figure, and then withdrawn. Prior to contracting such formers the mass of material is cut between the said formers at the points *x* by means of suitable cutters, thereby dividing the mass into sections, each of which will constitute a hollow girder. In order to impart proper strength to the girder, there is embedded therein at each side above the bottom between the outer and inner faces a series of metal rods *f*, which have hooks or heads at the ends and some of which are inclined from the center upward toward each end, as shown in Fig. 3. In order to embed the rods in the material, spacing-wires *g* are employed, which are twisted or looped at *g'* around the hook ends *f'* of the rods *f*, and forks *i* are placed upon the cores *e* beyond the wires *g* near one end to determine the width of the mass and length of the girders formed therefrom. In cutting the material between the cores the sides of each girder are grooved. As shown, these grooves are inclined in opposite directions on opposite sides of the center of each girder. The mass of material extends beyond the cores at one end to an extent limited by the wall *b*, erected on the base *a*, so that when the core are withdrawn from the mass there is left a plurality of hollow sections, each closed at one end and each having embedded in it the strengthening-wires at each side, and which when it is thoroughly dry constitutes the improved girder. The rods *f* add materially to the strength and rigidity of the girder, and owing to the inclination of some of the rods upward from the center toward the ends and to the enlargement of the ends by the hooks these rods serve as tension members of the girder, the ends of which are so anchored that a most effective resistance is offered to any strain tending to deflect the girder downward at the center. When the girders are set in the walls of a building, the solid ends serve to sustain the pressure of the walls, the girders being laid alternately with the solid end of one girder opposite the open end of another, and the grooves in the sides of the girders serve to receive cement, which is deposited between adjacent girders after they are laid, so that the whole series of girders when it is placed and cemented in position constitutes practically a continuous mass, each portion of which helps to support the other. By inclining the side grooves in opposite directions toward the center the grooves of one girder will coincide with those of the next, even when the latter is reversed in position.

I do not here claim the method of manufacture or apparatus shown, as the same are set forth in the separate division of this application, Serial No. 225,426.

I claim as my invention—

1. A beton column having a longitudinal cavity and with rods extending substantially the length of the column embedded in the sides thereof above the bottom and anchored at the ends, substantially as set forth.

2. A hollow beton column, substantially rectangular in cross-section, having longitudinal metallic rods embedded therein and one or more of its faces provided with grooves substantially as set forth.

3. A beton column substantially rectangular in cross-section, having a cavity formed therein closed at one end and provided on its side faces with inclined grooves substantially as set forth.

4. A column of beton having a longitudinal cavity, and with metallic rods extending substantially the length of the column and embedded within the cement at each side of the cavity, said rods headed at the ends and inclined downward toward the center of the column, substantially as described.

5. A new article of manufacture, a hollow column of beton having strengthening-rods and connections therefor embedded in the mass at each side between the inner and outer faces, substantially as described.

In testimony whereof I have signed my name to this specification in the presence of two subscribed witnesses.

HANS SIEGWART.

Witnesses:
S. SCHUMACHER,
JOSEPH F. VOLTZ.